United States Patent Office 3,290,029
Patented Dec. 6, 1966

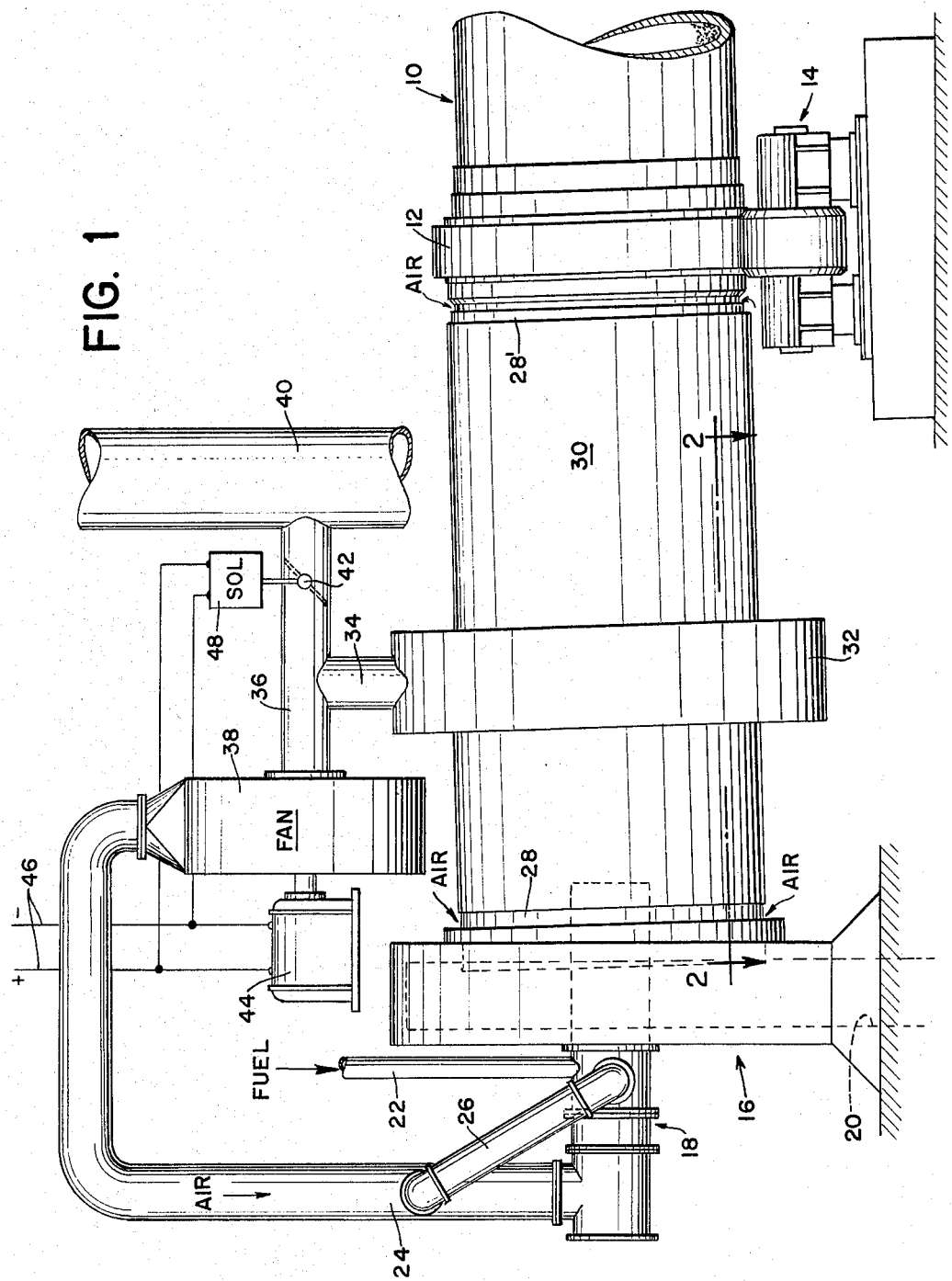

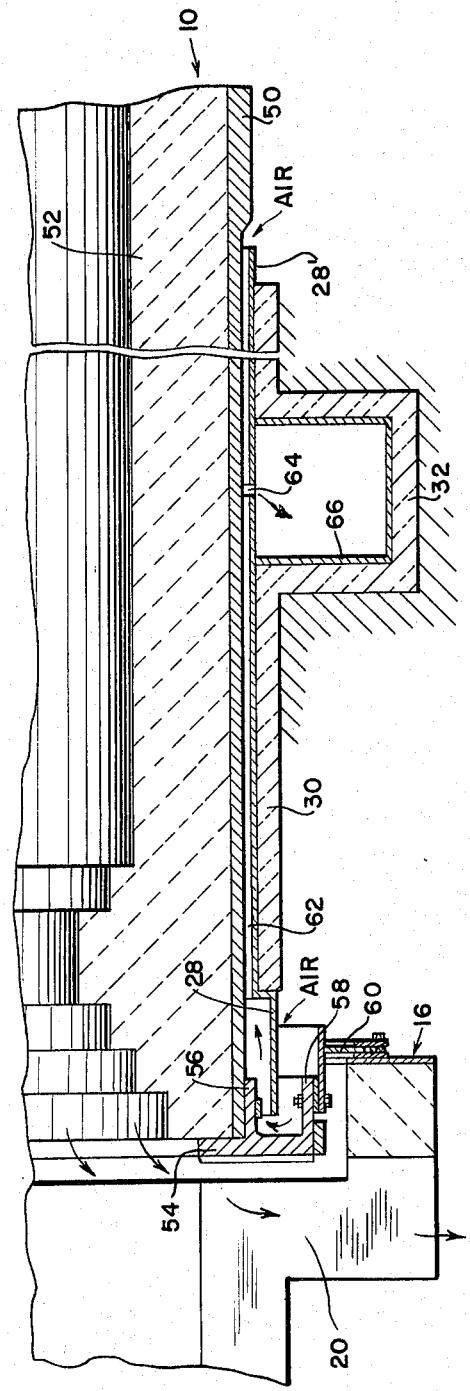

3,290,029
RECOVERY OF RADIANT HEAT LOSSES FROM SHELLS OF ROTARY KILNS
Gerhard Niemitz, Bronx, N.Y., assignor to Kennedy Van Saun Mfg. & Eng. Corporation, New York, N.Y., a corporation of Delaware
Filed Apr. 13, 1964, Ser. No. 359,065
7 Claims. (Cl. 263—44)

The present invention relates to a method and apparatus for recovering radiant heat losses from the steel shells of rotary kilns, particularly in the vicinity of the firing zone at the discharge end portions of such kilns.

In the burning of lime and the calcining of various minerals and inorganic materials for the production of Portland or other types of cement and the sintering of ores, where the operations are carried out in rotary kilns of the type now in use, extremely high temperatures prevail at the discharge end of such kilns where the firing takes place and the hot products are discharged. These discharged materials often have temperatures as high as 1800° to 3000° F. so that considerable heat is transferred through the refractory lining to the steel shell of the kiln along its discharge end portion.

The recovery of heat lost from the steel shells of such kilns has been disregarded to a large extent, and problems have arisen because of the danger of oxygen corrosion of the hot shell, deformation of its normal circular shape and high temperature differential between shell and refractory. These problems have arisen in spite of the fact that such kilns normally have a very thick lining of refractory brick. Heat insulation might be placed between the refractory brick and the steel shell, but this would be compressed by the expansion of the brick, so that they would not return to normal after the kiln was shut down, but would become loose and the lining fail. Non-compressible insulating materials might be used between the refractory brick and shell, but they usually have a low insulating quality.

Accordingly, the primary object of the present invention is to provide a non-corrosive alloy steel shell at and an insulated air jet around the discharge end portion of rotary kilns for the purpose of reducing the temperature differential between lining and shell and avoid corrosion and other difficulties referred to above.

A further object of the invention is to maintain a desired shell temperature and recover the heat radiated or otherwise transferred through the shell of the kiln along its discharge end portion where the temperatures would be extremely high.

A rotary kiln according to the present invention, therefore, includes a cylindrical steel shell, of non-corrosive alloy at least along the discharge end portion, lined with a refractory lining and having a firing end from which hot calcined or burned material is discharged. The kiln, as usual, includes a burner means projecting into the firing end of the kiln, means for conducting a fuel such as gas, oil or pulverized coal to the burner and a blower means connected into the burner means for supplying air thereto. In such a construction, the invention comprises the improvement of an air jacket surrounding the firing end portion of the kiln where the shell becomes the hottest, said jacket being spaced from the shell for the flow of air and including an air inlet along the peripheral end of the kiln, and a duct connecting the space between the air jacket and the shell, at a point remote from said inlet, with the air inlet of said blower means so that the heat transmitted by the shell is recovered, utilized in the burner and thereby returned to the kiln.

In a preferred construction, the air jacket is insulated against heat losses and is provided with an annular hot air outlet leading into an annular duct surrounding the air jacket. The construction also includes a nose ring for the discharge end of the kiln with which the jacket is associated to cause the flow of air in contact with the nose ring and then along the space between the steel shell and the jacket.

The kiln installation also preferably includes a stack connected by a branch duct with the hot air duct leading from the air jacket to the blower means and a damper or valve in the branch duct leading to the stack provided with a control responsive to the operation of the blower means for closing the damper in the duct to the stack and opening the damper means when the blower or fan is not operating.

The present invention includes other features and details including an air jacket arrangement for recovering the heat losses from rotary kilns provided with satellite coolers.

A construction and arrangement according to the invention has a number of advantages, including the recovery of high temperature heat, and its return to the kiln for the purpose of maintaining a proper equilibrium between the heat being radiated from the shell of the kiln and absorbed by the air in the air jacket. A balance can be maintained between the required quantity of combustion air for the burner and the cooling air passed through the jacket to give the correct equilibrium. The alloy shell of the kiln is kept at a temperature, for example about 1000° F., which will give a low differential expansion between shell and refractory and avoid oxygen corrosion and which will maintain the shell stiffness against deformation. Loss of radiated heat from the kiln shell is reduced as much as possible.

The connection of the hot air supply duct with the stack and the provision of a responsive damper control therein prevents the overheating of the shell of the kiln in the event of a power failure or failure of the blower or other vital operating equipment, since the stack draft, when the damper is open, will cause the flow of cooling air through the jacket and prevent the overheating of the discharge end portion of the kiln by the highly heated calcined product therein.

Other features, objects and advantages of the invention are described more in detail hereinafter in connection with the accompanying drawings forming a part of this application.

In the drawings:

FIG. 1 is an elevational view of the discharge end portion of a rotary kiln illustrating the general features of a construction according to the invention;

FIG. 2 is a broken sectional view taken along the line 2—2 of FIG. 1, on an enlarged scale;

FIG. 3 is a view similar to that of FIG. 1, with parts broken away, illustrating the application of the invention to the discharge end of a rotary kiln provided with satellite material coolers; and FIG. 4 is a broken sectional view taken on the line 4—4 of FIG. 3, on an enlarged scale.

Referring to FIG. 1 of the drawings, it shows the discharge end portion of a rotary kiln 10 provided with a tire or riding ring 12 supported on a conventional set of carrying rollers 14. The end portion of the kiln 10 includes the usual firing hood assembly 16, movable toward and away from the end of the kiln in accordance with usual practice. A burner tube 18 is mounted in the hood and projects into the end of the kiln 10 for heating the material being processed, such as limestone, the calcined product of which is discharged from the end of the kiln through an outlet 20 in the bottom of the hood 16. A fuel supply line 22 is connected into the burner, which is also supplied with hot air through a large insulated air duct 24, and a branch duct 26 for supplying primary air to a point adjacent the fuel inlet 22. The ducts 22, 24 and 26 may be provided with the usual flow control valves or dampers.

In accordance with the invention, the discharge end portion of the kiln 10 is surrounded by a steel air jacket 28, 28' carrying an outer layer of insulating material 30. An insulated hot air duct 32 surrounds the air jacket for receiving air from the space between the jacket 28, 28' and the shell of the kiln 10. Hot air is conducted from the duct 32 through a connection 34 into a duct 36 leading to the intake of a blower or fan 38 which delivers hot air into the burner air supply duct 24. The duct 36, or a suitable connection, is also connected into a stack 40 and provided with a damper 42 between the stack and the duct 34.

The damper 42 is advantageously made responsive to the operation or nonoperation of the blower 38, so that while the blower is in operation, the damper 42 is closed and air is drawn into the air jacket 28, 28' and supplied to the burner 18. However, when the blower 38 is stopped or is out of operation, the valve 42 in response to the nonoperation of the blower 38 opens so that the draft of the stack 40 applies suction to the ducts 32 and 34 to draw air into the jacket 28 and prevent overheating of the shell of the kiln 10 by the hot calcined product in the lower end portion of the kiln. In the construction illustrated in FIG. 1, the blower 38 is illustrated as being driven by an electric motor 44 supplied with electric current through the current supply lines 46 which are also connected into a solenoid 48 for operating the damper 42. The solenoid is arranged in a known manner such that when it is energized in parallel with the motor 44, it closes the damper 42 and maintains it closed, whereas when the solenoid is deenergized a counterweight or a spring or other means actuates the damper 42 to open position. The damper 42 may be released and opened in response to a loss of pressure at the outlet of the blower 38 or of suction at its inlet.

FIG. 2 shows more in detail the structure and arrangement of the steel air jacket 28, 28' in connection with the discharge end portion of the rotary kiln 10, which comprises a steel shell 50 lined with refractory fire brick 52 in a conventional manner. The discharge end of the kiln is provided with a cast alloy steel nose ring 54, having spaced annular forward-projecting flanges 56 and 58, the former of which is secured to the end of the shell 50, while the latter flange, 58, carries an annular sealing unit 60 connected with the forward rim of the hood 16.

The steel air jacket, as shown in FIG. 2, comprises two longitudinally-extending sections 28 and 28'. The end of the section 28 at the discharge end of the kiln projects into the annular space between the flanges 56 and 58 of the nose ring, so that air is drawn in against the nose ring 54 and around the end edge of the jacket 28, thereby effecting cooling of the nose ring. Thereafter, the air after cooling the nose ring 54, including its heat conducting flanges 56 and 58, flows forward along a thin annular space 62 to an annular slot 64 between the adjacent spaced ends of the sections 28, 28' where the air heated by the shell 50 flows into the annular duct 32, comprising a steel shell 66 welded to the jacket sections 28, 28' on the respective sides of the slot 64. The shell 66 is covered with heat insulating material as illustrated. Air is also drawn into the jacket section 28' at its forward end, entirely around the kiln and flows along the space 62 to the annular slot 64 and then into the annular duct 32.

The air jacket comprising the sections 28, 28' may be stationary, or rotatable with the rotary kiln 10, but it is preferably dimensioned so that the thickness of the cooling air stream in the space 62 is correlated with the required quantity of combustion air for the particular kiln operation, so that the correct equilibrium is established for the heat being radiated from the shell and that absorbed by the air and to be reintroduced into the flame of the burner 18. If the air jacket structure is stationary, it should be made adjustable with respect to the shell of the kiln to compensate for any deflection of the kiln shell, although the uneven thickness of the air stream in the space 62 is not particularly important due to the fact that the shell of the kiln rotates relative to the air jacket structure. This relative rotation distributes the cooling effect sufficiently, even with some unevenness in the thickness of the air stream along the shell.

The air requirements for a particular kiln and particular operation are usually known within reasonable limits so that it is possible to construct the air jacket to provide the required amount of air for the burner. In a particular example in connection with the operation of an 8 foot lime kiln and a requirement of 4100 c.f.m. of air at 600° F. going to the air fan 38, the jacket 28, 28' should extend from a point adjacent the last riding ring to the end of the kiln and be spaced from the outer surface of the steel shell approximately 1 inch. This spacing will provide adequate cooling and air for the burner. However, the annular slot 64 between the sections 28 and 28' is arranged to be about 1 inch wide at the bottom of the kiln and reduced to about ¾ inch wide at the top. This will promote equalization of the air flow along the kiln shell.

The recovery of normally lost radiant heat from rotary kilns by the method and apparatus of the present invention is not only applicable to rotary kilns presenting a cylindrical steel shell, such as the kiln described above but is also applicable to other kilns, for example, rotary kilns provided with satellite product coolers of the type illustrated in FIGS. 3 and 4. In FIG. 3 a rotatable kiln 70 is illustrated as being provided with a circular series of satellite product coolers 72, each of which is a large cylindrical steel pipe open at the right-hand end and connected into the lower end of the kiln 70 by a passageway 74 through which the clinker or calcined product flows, as illustrated in the lower part of FIG. 3. The hot calcined product delivered into the satellite coolers 72 is cooled by air which flows in through the right-hand open ends of the coolers and through the passages 74. The hot air entering the kiln 70 through the passages 74 flows around the burner tube 18' and provides the secondary air therefor.

The satellite coolers 72 rotate with the kiln 70 and their discharge ends are held in place around the shell of the kiln by an end baffle or header 76 welded to the shell of the kiln 70 and through which the satellite coolers 72 extend.

In accordance with the present invention the discharge end portion of the kiln 70, including most of the outer surfaces of the satellite coolers 72 are surrounded by a stationary air jacket 78, which can be made rotatable if desired. The jacket 78 engages the periphery of the rotary header 76 and includes an inwardly-extending end 80 which engages a sliding air seal 82 carried by the end of the kilns 70 and which is also in sliding engagement with a closure 84. Air at atmospheric temperature for cooling the shell of the kiln 70 and the surfaces of the satellite cooler 72 is drawn into the bottom of the jacket 78 through air inlets 86, while hot air is discharged at the top of the jacket into a collecting duct 88 through air outlets 90. The duct 88 is connected into the duct 34' and the appartus, as shown in FIG. 3, is intended to include all of the associated equipment illustrated in FIG. 1. It is to be understood that the jacket 78 and air ducts 34' and 88, as well as other ducts, are covered with heat insulating material so that the temperature of the air leaving the air jacket in either FIG. 1 or FIG. 3 will not fall appreciably in being delivered to the burner.

In order to balance the air flow, the inner and outer sides of the satellite coolers 72 may be provided with short air baffles 92 extending respectively toward the steel shell of the kiln 70 and the steel shell of the air jacket 78. These baffles are illustrated in FIG. 4 by the short baffles 92 extending toward the shell of the kiln 70. One of these baffles is shown in FIG. 3. Since the air for cooling is drawn in along the bottom of the stationary jacket 78 through the inlets 86 and the satellite coolers move with the rotating kiln, each satellite cooler will receive the same cooling action, and the same will be true of the surface area of the kiln 70.

Most rotary kilns used for the manufacture of Portland cements and lime are operated as efficiently as reasonably possible from the standpoint of recovering heat from the gases flowing from the inlet end of the kiln, for example by using them for preheating the charge, and by cooling the high temperature product with air to be used in the firing of the kiln. The present invention further increases the economy and efficiency of rotary kilns, and at the same time gives the other advantages referred to above. For example, it has been estimated in connection with the burning of limestone for the production of lime that the present invention would result in a saving of approximately 5½% of the fuel cost for burning the lime. This is an important and unexpected saving in view of the efficiencies already achieved in the art.

It is to be understood that the various features of the invention may be modified in some respects and at the same time accomplish the objects and advantages referred to herein. Such modifications are contemplated within the spirit and scope of the invention as defined in the appended claims.

I claim:
1. In a rotary kiln for calcining minerals including a steel shell lined with a refractory lining and having a firing end from which hot calcined material is discharged, a burner means projecting into the firing end of the kiln, a blower means connected into the burner means for supplying air thereto, an air jacket surrounding the firing end portion of the kiln where the steel shell becomes hottest, said jacket being spaced from the steel shell for the flow of air and including an air inlet along a portion thereof, an air duct extending from the intake of the blower means and connected into the space within the air jacket at a location remote from said air inlet to the jacket, the improvement comprising a stack, a branch duct connecting the stack to the air duct, a valve in the branch duct, and means responsive to the operation of the blower for holding said valve closed.

2. A rotary kiln as claimed in claim 1, including an electric motor for driving the blower, an electrically-operable means for holding the valve closed, and means for supplying electric current in parallel to said motor and said electrically-operable means.

3. In a rotary kiln for calcining minerals including a steel shell lined with a refactory lining and having a firing end from which hot calcined material is discharged, a burner means projecting into the firing end of the kiln, a blower means connected into the burner means for supplying air thereto, means forming an air jacket surrounding the firing end portion of the kiln where the steel shell becomes hottest, said jacket being spaced from the steel shell for the flow of air and including an air inlet along a portion thereof, an air duct extending from the intake of the blower means and connected into the space within the air jacket at a location remote from said air inlet to the jacket, the improvement in which the air jacket includes a cylindrical member having an inlet at each end adjacent to the shell of the kiln, means comprising an annular slot in the jacket defining an air outlet intermediate said ends, and a duct connected to the jacket on the respective sides of said slot.

4. A rotary kiln as claimed in claim 3, in which said slot is narrower at the top of the jacket than at the bottom.

5. In a rotary kiln for calcining minerals including a steel shell lined with a refractory lining and having a firing end from which hot calcined material is discharged, a burner means projecting into the firing end of the kiln, a blower means connected into the burner means for supplying air thereto, an air jacket surrounding the firing end portion of the kiln where the steel shell becomes hottest, said jacket being spaced from the steel shell for the flow of air and including an air inlet along a portion thereof, an air duct extending from the intake of the blower means and connected into the space within the air jacket at a location remote from said air inlet to the jacket, the improvement in which the discharge end of the kiln carries an annular nose ring having a pair of spaced annular flanges and the air jacket includes an annular end edge extending into the space between said flanges and in spaced relation thereto for causing cool air to flow into said space and then into said jacket.

6. In a rotary kiln for calcining minerals including a steel shell lined with a refractory lining and having a firing end from which hot calcined material is discharged, a burner means projecting into the firing end of the kiln, a blower means connected into the burner means for supplying air thereto, an air jacket surrounding the firing end portion of the kiln where the steel shell becomes hottest, said jacket being spaced from the steel shell for the flow of air and including an air inlet along a portion thereof, an air duct extending from the intake of the blower means and connected into the space within the air jacket at a location remote from said air inlet to the jacket, the improvement in which the air jacket comprises a cylindrical steel casing extending around the discharge end portion of the kiln and spaced therefrom to form a narrow air space, said casing being open at both ends for the flow of air into said space, and said air duct being connected into said air space at a location intermediate the ends of the jacket.

7. In the method of recovering heat from the steel shells of rotary kilns and protecting such shells from overheating particularly by the calcined product therein, in which cooling air is passed in a confined zone in contact with the outer surface of the discharge end portion of the steel shell to be protected, collecting the resulting heated air passed over the exterior surface of the kiln shell in said zone and conducting it into the discharge end portion of the kiln with fuel for heating the kiln, the improvement comprising passing the calcined product produced in the kiln through a cooler, passing the cooling air in heat exchange with said cooler and then into said confined zone in contact with the steel shell of the kiln.

References Cited by the Examiner
UNITED STATES PATENTS

| | | | |
|---|---|---|---|
| 1,675,416 | 7/1928 | Linhard | 263—32 |
| 2,007,676 | 7/1935 | Falla | 263—33 |
| 2,852,242 | 9/1958 | Simon | 263—33 |
| 2,859,955 | 11/1958 | Petersen | 263—32 |
| 3,016,236 | 1/1962 | Alonso | 263—32 |

FOREIGN PATENTS 230,465    4/1944    Switzerland.

FREDERICK L. MATTESON, Jr., Primary Examiner.

JOHN J. CAMBY, Examiner.